May 6, 1958 L. D. GILMORE ET AL 2,833,190
PHOTOGRAPHIC METERING FILM MAGAZINE
Filed Sept. 30, 1955 3 Sheets-Sheet 1

INVENTORS
LOREN D. GILMORE
SIMON K. CHEN
Paul O. Pierce ATTORNEY

May 6, 1958  L. D. GILMORE ET AL  2,833,190
PHOTOGRAPHIC METERING FILM MAGAZINE
Filed Sept. 30, 1955  3 Sheets-Sheet 2

INVENTORS
LOREN D. GILMORE
SIMON K. CHEN
Paul O. Pippel
ATTORNEY

May 6, 1958 L. D. GILMORE ET AL 2,833,190
PHOTOGRAPHIC METERING FILM MAGAZINE
Filed Sept. 30, 1955 3 Sheets-Sheet 3

INVENTORS
LOREN D. GILMORE
SIMON K. CHEN

Paul O. Pippel
ATTORNEY

United States Patent Office 2,833,190
Patented May 6, 1958

2,833,190

PHOTOGRAPHIC METERING FILM MAGAZINE

Loren D. Gilmore, Glenn Ellyn, and Simon K. Chen, Maywood, Ill., assignors to International Harvester Company, a corporation of New Jersey Application September 30, 1955, Serial No. 537,787

6 Claims. (Cl. 95—31)

This invention relates to a rotatable photographic film magazine adapted for use in special type cameras requiring precision movement of the photographic film during the period of exposure. More in particular this invention relates to a rotatable film magazine mechanism operable to move portions of a reel of unexposed film whereby the said portions are successively moved into the camera exposing position and after exposure of each portion of the film the said successive film portions being wound upon a second reel, all of said movements being made without the necessity of opening the device in a photographic dark room.

It is a well known principle to insert a spool of unexposed film into a camera and by means of a take-up spool move successive portions of the unexposed film into position for exposure and then after exposure of each portion winding the exposed portion on a take-up spool which positions the next unexposed portion in position before the lenses. Thus the operation may be repeated after each exposure until the unexposed spool of film has been exhausted. However in certain types of specialized cameras to which this invention is directed it is necessary to move the film during the period when exposure is taking place. An example of such a camera with a specific application wherein this invention is particularly adaptable as an embodiment thereof will first be described briefly.

In the study of ways and means for improving the design of internal combustion engines it is often desirable to determine the pressure characteristics of each cycle in each of the combustion chambers of the engine when it is operated under various speeds and loads. One way for obtaining such characteristics is by inserting in the engine a highly pressure-sensitive electronic device with the sensitive element exposed to the combustion chamber. By suitable electrical means the impulses received from the pressure-sensitive device are transmitted and amplified to energize an ordinary oscilloscope. A point-source of light emanating from the oscilloscope moves vertically in fixed ordinate distances calibrated to corresponding pressure applied to the pressure sensitive device. Thus as the pressure is increased the point source of light emanating from the oscilloscope is elevated a corresponding calibrated distance in a vertical direction. At this point it may be readily seen that when the arrangement is applied to the combustion chamber of an engine, the point-source of light emanating from the oscilloscope will oscillate vertically to form what appears to be a vertical line extending from the maximum pressure to the minimum pressure applied as calibrated. Thus the maximum and minimum pressures occurring within the combustion chamber during the various cycles of the engine under test operation may be ascertained from inspection of the vertical line formed by the calibrated oscilloscope. A similar line on a stationary photographic film would of course result from directing the point source of light to the stationary unexposed film.

However if the photographic unexposed film is caused to move horizontally at a predetermined speed in relation to the speed of the engine during one or more of its various cycles, the curve described on the moving film introduces the element of time as the abscissa of the curve so formed. Thus the ordinate of any point on the curve obtained illustrates graphically the pressure occurring within the combustion chamber precisely for the corresponding position of the engine's piston at any given time during a given cycle while the engine is in operation. Of course it should be understood that in a multi-cylinder engine a similar pressure characteristic curve may be obtained from each combustion chamber.

One of the methods used to obtain phtographic curves of engine characteristics as above described is to mount, in a photographic dark room, a length of unexposed film on the outer periphery of a cylindrically shaped drum. The drum is provided with a shaft for rotating the drum with the film axially. The drum and film are then inserted within the camera and sealed light-tight after which the assembly is removed from the dark room and positioned for reception of the beam from the oscilloscope. The drum and film are then rotated at a speed synchronized with the engine under test. A frequently used means for driving the drum is an ordinary selysn motor powered by a selysn generator driven by the engine under test.

With the drum and film rotating at a speed synchronized with the engine, by electronic means the oscilloscope is energized for a period substantially equal to the time required for the drum to make one revolution thus describing as a graphical curve on the film the path taken by the point source of light beam emanating from the oscilloscope.

Now one of the chief problems of known types of special cameras of the kind described is that the camera's entire film unit must be removed to a photographic dark room, opened for removal of exposed film from the drum and inserting unexposed film on the drum, re-assembling the unit including sealing against light between each test exposure made. The only other known alternative is to provide numerous individual and interchangeable cameras, one of each being necessary of reach exposure made. This invention overcomes the above referred to problem by providing an externally operable film magazine mechanism within the rotatable drum whereby a reel having sufficient unexposed film for several individual exposures may be inserted therein, outside of a dark room, said mechanism including means for winding up exposed portions of the film simultaneously positioning unexposed film for subsequent exposure. Thus, depending upon the length of film, several exposures may be made from a single roll of film covering various engine test conditions within a relatively short period of time without resorting to dark room conditions. In fact according to this invention the only time a photographic dark room is necessary is when the entire reel of exposed film is developed by commonly known methods.

Therefore, it is a prime object of this invention to provide a camera with a rotatable magazine film holder having an externally operable film metering mechanism.

A further object of this invention is to provide a rotatable magazine film holder for a camera having automatic means for dynamically balancing said holder for high speed rotation.

A still further object of this invention is to provide a magazine film holder according to the preceding objects whereby the unexposed film may be inserted into the magazine, metered into position for exposure, and the exposed film removed from the holder without a photographic dark room.

These and other desirable objects inherent in and encompassed by the invention will be more readily understood from the ensuing description, the appended claims and the annexed drawings wherein:

Figure 1:
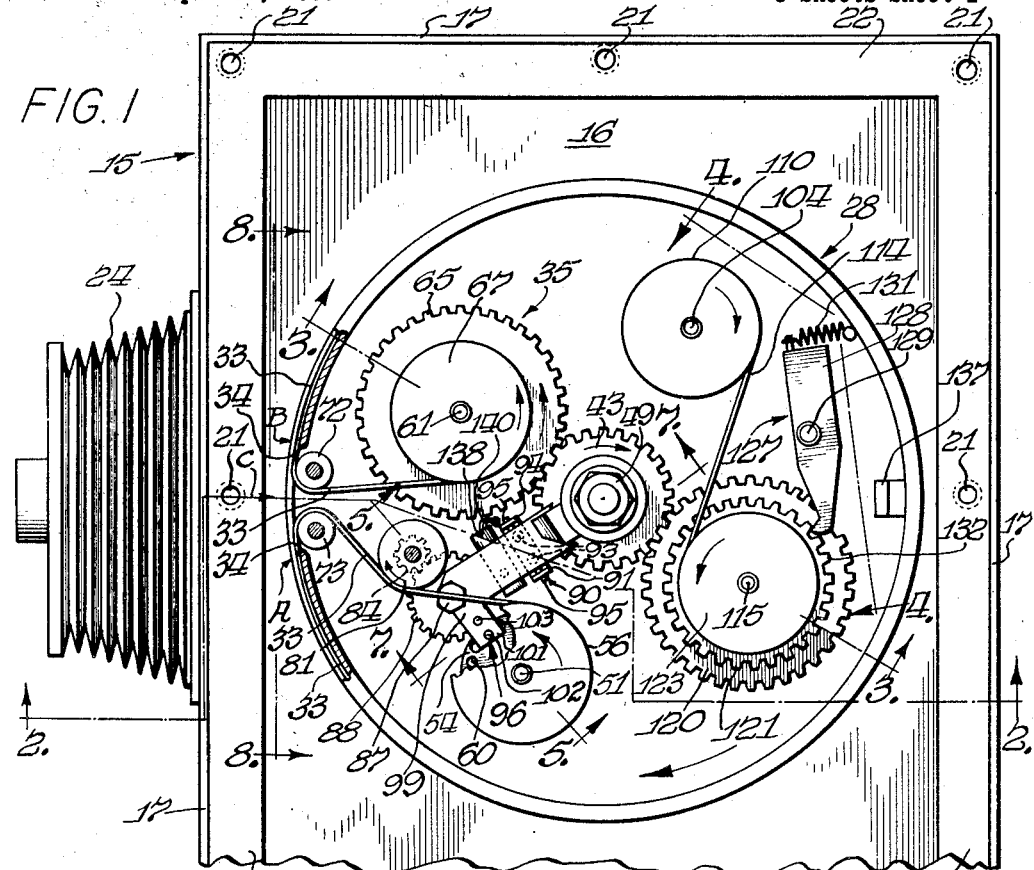
Figure 1 is a top elevational view, partly in section, of the camera with the cover plate of the chamber removed and the rotatable drum, with its top end plate removed, showing the general arrangement of the film magazine mechanism.

Referring to the drawings the numeral 15 indicates generally a camera having a light-tight chamber 16 formed by four walls 17, bottom wall 18 and removable cover plate 19. The cover plate 19 is rigidly connected to the walls 17 by suitably disposed screws, one of which is shown at 20, threadedly fitted into bores 21 of angle bars 22, the bars 22 being rigidly connected to the walls 17. One of the walls 17 is provided with an aperture 23 therethrough. The aperture 23 is suitably covered by the usual camera bellows 24 having proper lenses (not shown) mounted therein. Means for permitting photographically receptive rays through the bellows 24 and lenses into the chamber 16 for a predetermined period of time may be provided in accordance with various known devices.

On the bottom wall 18 of the chamber 16 centrally located is mounted a bearing member 25. A vertically disposed drive shaft 26 is journalled for rotation in the bearing 25. The upper portion of the drive shaft 26 is of reduced diameter as shown at 27 of Figure 3.

A cylindrically shaped drum generally indicated at 28 is provided with a bottom end plate 29 and a removable top end plate 30. The outer peripheral surface 31 of the drum 28 is provided with an annular groove or film track 32 of sufficient vertical width to accommodate the desired size or width of photographically active film to be used such as that illustrated at 33. Thus the film track 32 prevents vertical movement of the film 33 disposed about the periphery of the drum 28. From this it should be understood that the film track 32 supports a portion of the film 33 on the outer periphery of the drum 28 providing an exposure area for the film 33 to photographically receptive rays entering the chamber 16 through aperture 23 and bellows 24.

A vertically disposed slot or opening 34 is provided on the peripheral surface of the drum 28. This opening 34 provides a means for feeding and returning photographically active film 33 from the film track 32 to the film magazine generally indicated at 35.

Figure 3:
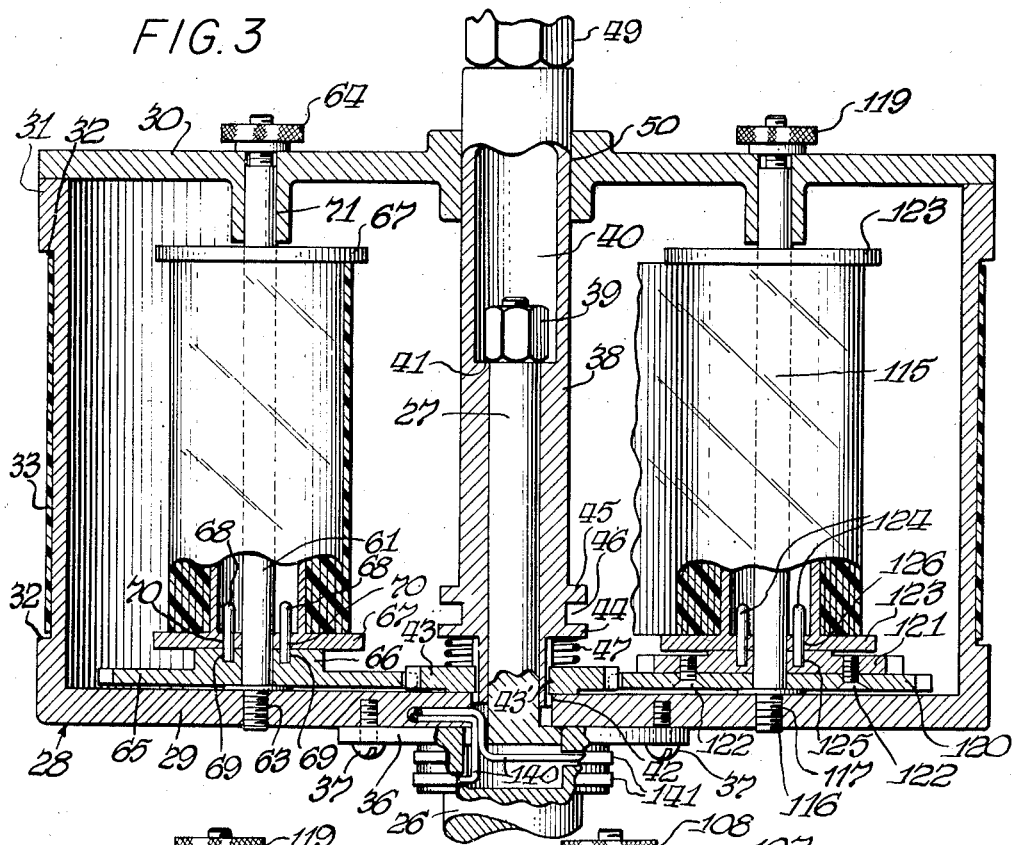
Figure 3 is another side elevation, partly in section, taken along the line 3—3 of Figure 1 illustrating a view of the arrangement of the film reels within the drum, parts of the gearing mechanism being removed.

The drum 28 is mounted on the drive shaft 26 for rotation therewith. A collar 36 is welded or pressed on the drive shaft 26 and rigidly connected to the bottom end plate 29 of the drum 28 by suitably disposed screws 37 threadedly fit into the plate 29 as best shown in Figure 3. Thus it will be seen that rotation of the drive shaft 26 will cause axial rotation of the drum 28.

In order to provide means for operating the film magazine there is provided a sleeve shaft 38 disposed concentrically about the reduced diameter portion 27 of the drive shaft 26. The sleeve shaft 38 is slidably fitted to the upper portion 27 of the drive shaft 26 for vertical movement in relation thereto. The upper end of the drive shaft 27 is threaded to receive a cap nut 39. The upper portion of the sleeve shaft 38 is provided with a large bore as shown at 40 for reception of the cap nut 39. From Figure 3 is will be seen that the cap nut 39 abuts the shoulder 41 thus limiting the upward movement of the sleeve shaft 38 in respect to the drive shaft 26. The lower end of the sleeve shaft 38 is journalled for rotation relative to the drum 28 in a small bore 42 disposed in the bottom end plate 29 of the drum 28. A first gear 43 is positioned adjacent the bottom end plate 29 in the drum 28 and constrained for rotation with the sleeve shaft 38. The gear 43 is splined at 43' slidably to the sleeve shaft 38 to allow vertical movement of the sleeve shaft 38 relative to the gear 43.

As best illustrated in Figure 3 the sleeve shaft 38 is provided with a pair of annular flange portions 44 and 45 in spaced relation to form a circumferential groove 46. Between the lower flange 44 and the gear 43 is a captive helical spring 47 disposed concentrically about a lower portion of the sleeve shaft 38 to urge the sleeve shaft 38 upwardly for engagement of the cap nut 39 with the shoulder 41.

Figure 2:
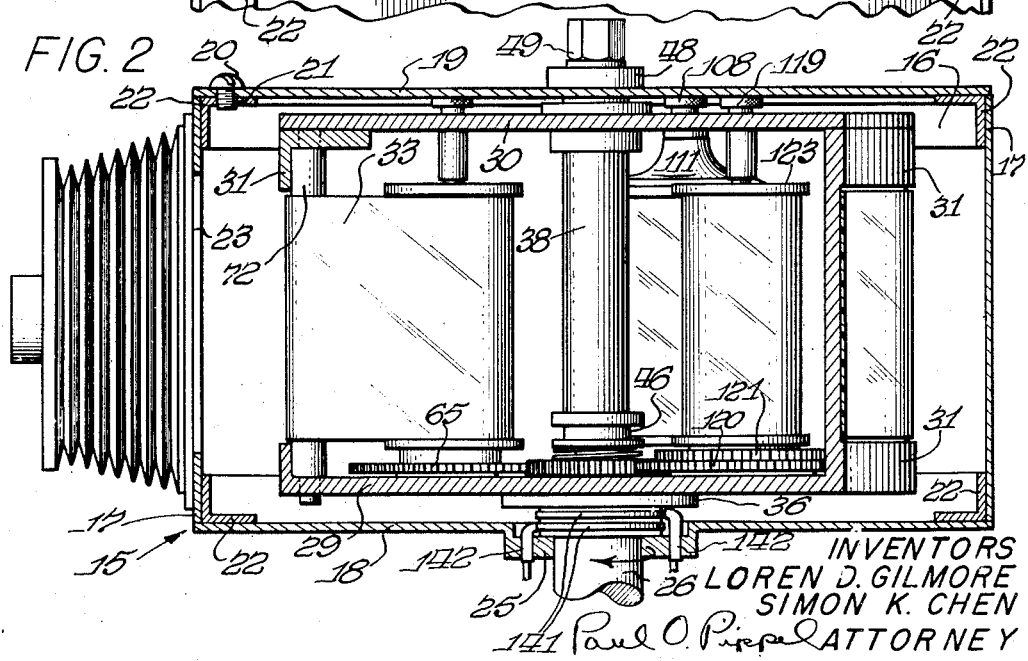
Figure 2 is a side elevation, partly in section, taken along the line 2—2 of Figure 1 illustrating the general arrangement of the film reels of the magazine in the drum within the camera.
Figure 10:
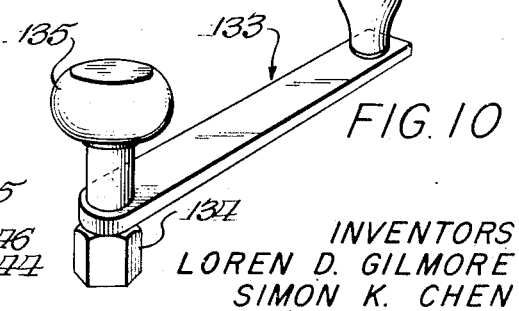
Figure 10 is a perspective view of a removable tool or crank for manually operating the mechanisms in the magazine to move the film therein.

Coaxially with the sleeve shaft 38 there is provided a bearing 48 in the cover plate 19 so that the uppermost portion of the sleeve shaft 38 rotatably extends through the bearing 48 externally of the chamber 16 as best shown in Figure 2. The outer end 49 of the sleeve shaft 38 is milled hexagonally for reception into a tool or crank 133 illustrated in Figure 10. At this point it can be seen that the sleeve shaft 38 may be moved vertically in respect to the drive shaft 26 and drum 28 and may also be rotated in respect to the drive shaft 26 and drum 28.

In order to further stabilize the sleeve shaft 38 in respect to the drive shaft 26 there is provided a bore 50 in the top end plate 30 of the drum 28 in vertical slidable relation.

Figure 5:
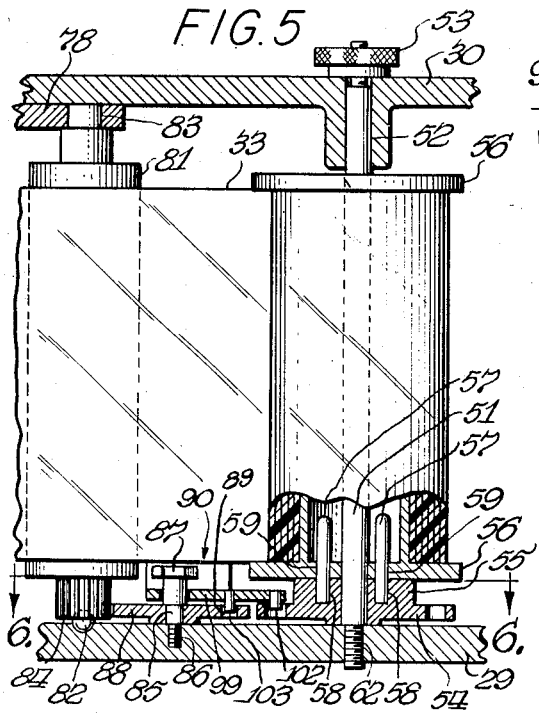
Figure 5 is a side elevation, partly in section, taken along the line 5—5 of Figure 1 showing the gearing mechanism associated with the unexposed active film and metering roller.

Now referring to Figures 1 and 5 a first spindle 51 is mounted vertically in the drum 28. The lower end of the first spindle 51 is threadedly fit at 62 into a bore in bottom end plate 29 of the drum 28. The upper end of the spindle 51 is slidably fit into a small bore or hole 52 in the top end plate 30 of the drum 28. The upper end of the spindle 51 is threaded to receive a nut 53 which nut serves to hold the top end plate 30 from upward movement. On the inside of the drum 28 adjacent the bottom end plate 29 is a rotatable disk 54 circumferentially disposed about the spindle 51. A hub portion 55 of the disk 54 provides a seat for a first reel 56 which reel is constrained for axial rotation with the disk 54 by means of a pair of vertically extending pins 57 press fitted into bores 58 in the hub 54 and slidably fitted into bores 59 of the reel 56. The reel 56 is slidably fitted over the spindle 51. From this it can be seen that in the position shown in Figure 5 the reel 56 is rotatable about the spindle 51 and is keyed for rotation with the disk 54. The construction of the reel 56 is the same as that commonly used by commercial photographic film manufacturers and is adapted to support a supply of unexposed photographically active film for dispensing thereof as described later.

Figure 6:
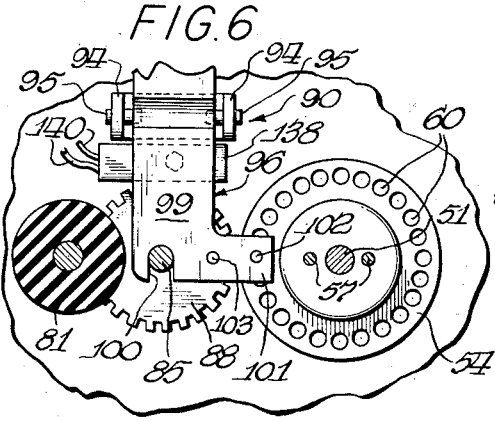
Figure 6 is a top elevation, partly broken away, taken along the line 6—6 of Figure 5 illustrating the latch mechanism associated with the film metering mechanism.

Referring to Figures 1 and 6 it will be seen that the disk 54 is provided with a plurality of vertically disposed holes 60 spaced equidistant from the center of the disk 54 and adjacent to each other. The purpose of these holes or stop elements 60 will be discussed later.

Referring now to Figures 1 and 3 it will be seen that a second spindle 61 is mounted vertically in the drum 28. The lower end of the second spindle 61 is threadedly fit into a bore 63 in the bottom end plate 29 of the drum 28. The upper end of the second spindle 61 is slidably fit into a bore or hole 71 in the top end plate 30 of the drum 28. The upper end of the second spindle 61 is threaded to receive a nut 64 which nut serves to hold the top end plate 30 from upward movement. On the inside of the drum 28 adjacent the bottom end plate 29 is a rotatable second gear 65 circumferentially disposed about the second spindle 61. A hub portion 66 of the gear 65 provides a seat for a second reel 67 which reel is constrained for axial rotation with the second gear 65 by means of a pair of vertically disposed pins 68 press fitted into bores 69 in the hub 66 and slidably fitted into bores 70 of the second reel 67. The second reel 67 is slidably fitted over the second spindle 61. From this it can be seen that in the position shown in Figure 3 the second reel 67 is rotatable about the second spindle 61 and is keyed for rotation with the second gear 65. The construction of the second reel 67 is the same as that of the first reel 56 and is adapted for receiving and supporting the photographically active film 33 after exposure thereof from the film track 32. It will also be noted that the second gear 65 is in meshed relation with the first gear 43 as shown in Figure 1.

Figure 8:
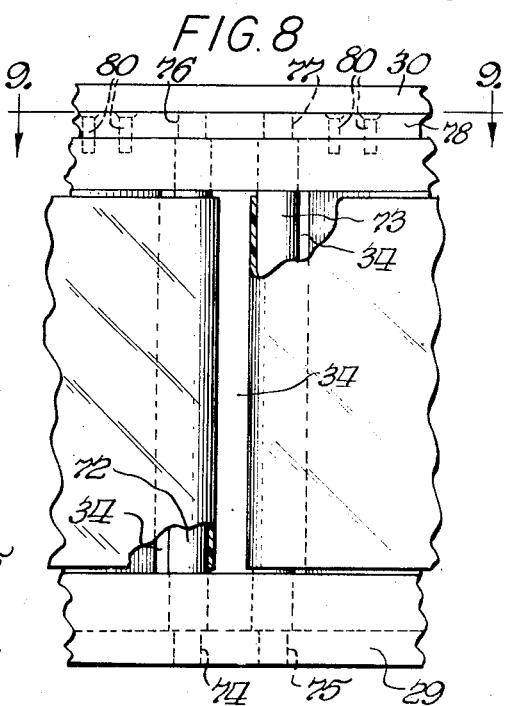
Figure 8 is a side elevation, partly broken away, taken along the line 8—8 of Figure 1 illustrating the idler rollers and drum opening for feeding and returning active film to the film track or exposure area on the outer periphery of the drum.
Figure 9:
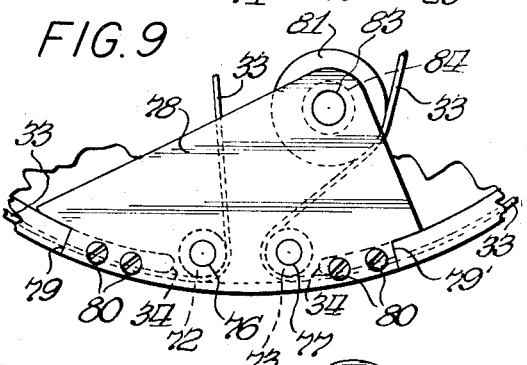
Figure 9 is a top elevation, partly broken away, taken along the line 9—9 of Figure 8 further illustrating the means for feeding active film from the magazine to the exposure surface and its subsequent return to the magazine.

Now in order to provide means for guiding the film 33 through the opening 34 in the periphery of the drum 28 to the film track 32 a pair of vertically mounted idler rollers 72 and 73 are positioned adjacent the opening 34 inside the drum 28 as best shown in Figures 1, 8 and 9. The lower ends of the idler rollers 72 and 73 are journalled for rotation in bores 74 and 75, respectively, in the bottom end plate 29 of the drum 28. The upper ends of the idler rollers 72 and 73 are journalled for rotation in bores 76 and 77, respectively, of an irregularly shaped support plate 78 shown in Figures 8 and 9. The support plate 78 is fitted for reception into a cutaway portion 79—79' of the upper and outer peripheral surface 31 of the drum 28 so that the top side of the support plate 78 is flush with or abuts the top end plate 30. The support plate 78 is rigidly connected in horizontal position to the surface 31 of the drum 28 by a plurality of suitably disposed screws 80 threadedly fit into the drum 28 as best shown in Figures 8 and 9. Thus the support plate 78 supports the upper ends of the idler rollers 72 and 73 for axial rotation.

Now referring to Figure 1 as the drum 28 rotates in a clockwise direction, indicated by the arrow, the exposure area of the film 33 on the film track 32 begins at point A and extends circumferentially in a counter-clockwise direction about the peripheral surface 31 of the drum 28 and ends at point B by the width of the film selected for use with this invention. For convenience this is termed the "exposure area" as the film 33 is in a position to receive photographically active rays entering the chamber 16 through the bellows 24 and associated lenses as the drum 28 rotates axially and the length of film 33 necessary to cover the exposure area is termed conveniently an exposure length or portion of the film 33.

We now describe means for automatically metering an exposure length or portion of film 33 dispensed from the supply of film 33 on the first reel 56 so that the film track 32 is covered for the entire exposure area without waste. Referring to Figures 1, 5 and 6 there is provided a vertically mounted rotatable metering roller 81, cylindrically shaped and preferably having an outer surface having resilient and high frictional characteristics such as that obtained with rubber. The metering roller 81 on its lower end is journalled for rotation on an antifriction bearing such as a ball 82 as shown in Figure 5, the upper portion of the ball 82 being seated axially in the lower end of the metering roller 81 and the lower portion of the ball 82 being seated in the bottom end plate 29 of the drum 28. The upper end of the metering roller 81 is journalled for rotation in a bore 83 in the support plate 78 as best shown in Figures 5 and 9. At the lower end of the metering roller 81 adjacent the bottom end plate 29 of the drum is mounted for axial rotation with the roller 81 a pinion gear 84. Thus the pinion gear 84 is constrained for rotation with the roller 81.

Figure 7:
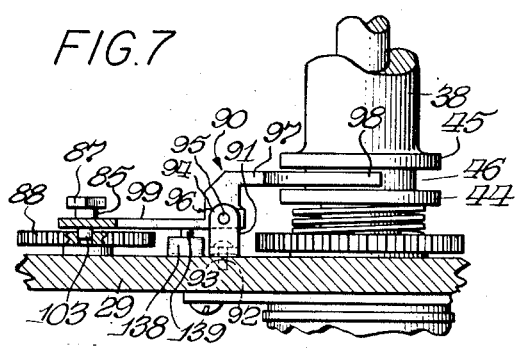
Figure 7 is a side elevation, partly broken away, taken along the line 7—7 of Figure 1 further illustrating the construction of the latch mechanism associated with the film metering device.

At a suitable point on the bottom end plate 29 of the drum 28 between the first spindle 51 and the metering roller 81 a stub pin 85 is threadedly fitted into a small bore 86 in the bottom end plate 29 of the drum 28 as best shown in Figures 5 and 7. The upper portion of the pin 86 is provided with a hexagonal head 87 which serves as a means for tightening of the pin 85 into the threaded bore 86.

Pivotally disposed on the pin 85 adjacent the bottom end plate 29 of the drum 28 is a fourth gear 88 in meshed relation with pinion gear 84 of the metering roller 81. A first stop element or vertical hole 89 is bored in the gear 88 (Figure 5) radially of its axis on the upper side thereof for a purpose to be described.

Referring now to Figures 1, 5, 6 and 7 there is illustrated a dual latch mechanism generally indicated at 90. As best seen in Figures 1 and 7 a U-shaped member 91 is rigidly mounted on the bottom end plate 29 by a pair of screws 93 threadedly fit into bores 92 of the plate 29. The bifurcated portions 94 of the U-shaped member 91 are provided with small pins 95 which pivotally connects a latch member generally indicated at 96. The latch member 96 is provided with an extended operating arm 97 which is bifurcated at its outer end portion 98 for operative reception into groove 46 of the sleeve shaft 38. Thus when the sleeve shaft 38 is moved downwardly as previously described the flanges 44 and 45 engage the latch member 96 for rocking motion about the pins 95.

Integrally connected to the arm 97 of the latch member 96 is a leg 99 having an opening 100 for slidable reception of the stub pin 85. The hexagonal head 87 thus provides a means for limiting the upward movement of the leg 99 responsive to the downward movement of the sleeve shaft 38 as previously described.

A protruding portion 101 of the leg 99 extending laterally thereof is provided with a pair of fingers 102 and 103 depending therefrom as best shown in Figures 5 and 6. From Figures 1 and 6 it will be seen that the finger 102 is adapted to engage one of the vertical holes or stop elements 60 of the disk 54 and the finger 103 is adapted to engage simultaneously the vertical hole or first stop means 89 of the gear 88. Thus it may be readily seen that when the finger 103 is not in registry with the single hole 89 of the gear 88, the finger 103 rides or rests on the upper surface of the gear 88 thereby maintaining the leg 99 of the latch mechanism 90 in an elevated position which prevents the finger 102 from engaging any of the holes 60 of the disk 54. However when the vertical hole 89 is moved into registry with the finger 103 the finger 103 engages the hole 89 and simultaneously therewith the finger 102 engages one of the holes 60 of the disk 54 by the force of spring 47 acting on the latch mechanism 90 through the sleeve shaft 38. From this it can be seen that when the latch mechanism is engaged as shown in the drawings, the first reel 56 is locked against axial rotation.

Referring to Figure 1 it will be seen that the film 33 as dispensed from the first reel 56 frictionally engages the metering roller 81, thence engages the idler roller 73, emerging from the interior of drum 28 through the slot 34 to the film track 32. The film 33 then passes counter-clockwise of the film track 32 from point A to point B where it enters the interior of drum 28 through the slot 34, engages the idler roller 72 and is wound or accommodated on the second reel 67. The frictional engagement of the film 33 to the metering roller 81 causes clockwise rotation of the metering roller 81 which through the pinion gear 84 moves the gear 88 in a counter-clockwise direction. In order to measure or meter one exposure length of film 33 to cover the film track 32 from point A to point B of the outer surface of the drum 28, the diameter of the metering roller 81 must be interrelated with the ratio of the pinion gear 84 to the gear 88 so that when the gear 88 completes one full revolution sufficient film 33 will have been dispensed from the first reel 56 to cover the film track 32. Thus each time the latch mechanism 90 is disengaged, the second reel 67 may be rotated to move by tension the film 33 from the first reel 56 until the metering roller 81 is frictionally rotated sufficient to rotate the gear 88 one revolution bringing the first stop means or hole 89 into registry with the finger 103, such registry automatically causing engagement of the latch mechanism 90 thereby locking the reel 56 against further rotation and thus terminating the further dispensing of the film 33 from the reel 56.

Now it can be appreciated that if the drum 28 including the film magazine 35 is to be rotated at high speed, the drum 28 must be well balanced as otherwise serious vibrations would occur which would affect the quality of photographic results as well as cause serious strain on the entire camera. In the course of taking several separate exposures on progressive exposure lengths of the film 33, the weight of the film initially is essentially disposed on the first reel 56 while but a negligible weight is disposed on the second reel 67. As the number of separate exposures of the film 33 is made, the film 33 progressively shifts to the second reel 67 and correspondingly diminishes on the first reel 56. Therefore it can be appreciated that the shifting of the weight of the film 33 in the drum 28 from the first reel 56 to the second reel 67 must be progressively compensated correspondingly in order to maintain a dynamic balance of the entire mechanism. We now describe means for maintaining a dynamic balance of the drum 28.

Figure 4:
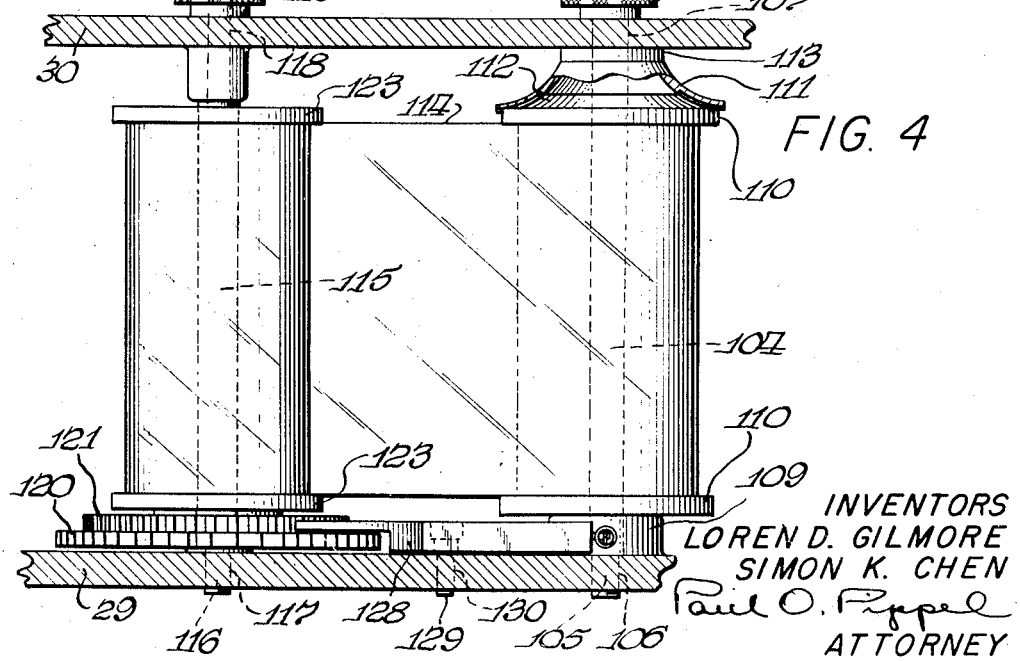
Figure 4 is a side elevation, partly in section, taken along the line 4—4 of Figure 1, illustrating the dynamic balancing reels and associated mechanism.

In the drum 28 positioned in substantially diametric spaced relation with respect to the first spindle 51 is a third spindle 104 vertically mounted on the bottom end plate 29 as best shown in Figures 1 and 4. The lower end of the third spindle 104 is threadedly fit at 105 into a bore 106 in the bottom end plate 29 of the drum 28. The upper end of the third spindle 104 is slidably fit into a small bore or hole 107 in the top end plate 30 of the drum 28. The upper end of the third spindle 104 is threaded to receive a nut 180 which nut serves to hold the top end plate 30 from upward movement. On the inside of the drum 28 adjacent the bottom end plate 29 is a collar 109 circumferentially disposed about the third spindle 104 which collar provides a seat for a third reel 110. The third reel 110 is slidably fit over the third spindle 104 so that the reel may be rotated axially. In order to resist yieldably the axial rotation of the third reel 110 on the third spindle 104 a friction element 111 is disposed circumferentially about the third spindle 104 between the upper end of the third reel 110 and the top end plate 30 of the drum 28 as shown in Figure 4. The friction element 111 may conveniently be horn-shaped the lower portion being serrated at 112 which compressively engages the top end of the third reel frictionally. The upper portion of the friction element 111 is welded at 113 to the top end plate 30 of the drum 28. Thus in the position illustrated in Figure 4, the third reel 110 may be axially rotated after overcoming the yieldable resistance against rotation caused by the friction element 111. The third reel 110 is adapted to carry a supply of material having substantially the same weight per unit length as the film 33. For convenience we have found that a film 114 similar to film 33 may be used except that the film 114 may be photographically inactive. The third reel 110 is adapted to dispense the film 114 to a fourth reel 123 discussed later.

With particular reference to Figures 1 and 4, in the drum 28 positioned in substantially diametric spaced relation with respect to the second spindle 61 is a fourth spindle 115 vertically mounted on the bottom end plate 29. The lower end of the fourth spindle 115 is threadedly fit at 116 into a bore 117 in the bottom end plate 29 of the drum 28. The upper end of the fourth spindle 115 is slidably fit into a small bore or hole 118 in the top end plate 30 of the drum 28. The upper end of the fourth spindle 115 is threaded to receive a nut 119 which nut serves to hold the top end plate 30 from upward movement. On the inside of the drum 28 adjacent the bottom end plate 29 is a third gear 120 circumferentially disposed and axially rotatable about the fourth spindle 115 as shown in Figures 1, 3 and 4. It will be noted that the third gear 120 is in meshed relation with the first gear 43. Directly above and integrally connected to the third gear 120 is a ratchet wheel 121. The ratchet wheel 121 may conveniently be constrained for rotation with the gear 120 by one or more screws 122 threadedly fit into suitably disposed bores in the gear 120 and ratchet wheel 121 as best shown in Figure 3. The upper surface of the ratchet wheel 121 provides a seat for a fourth reel 123 which reel is constrained for axial rotation with the third gear 120 and its associated ratchet wheel 121 by means of a pair of vertically extending pins 124 press fitted into bores 125 in the ratchet wheel 121 and slidably fitted into bores 126 of the fourth reel 123 as best shown in Figure 3. The fourth reel 123 is slidably fitted over the fourth spindle 115. From this it can be seen that in the position shown in Figure 3 the fourth reel 123 is rotatable axially about the fourth spindle 115 and is keyed for rotation with the ratchet wheel 121 and third gear 120. The construction of the third reel 110 and fourth reel 123 is the same as that of the first reel 56. The fourth reel 123 is adapted for receiving and supporting the photographically inactive film 114 from the third reel 110.

Now in order to restrict axial rotation of the second reel 67 and fourth reel 123 to one direction for preventing the films 33 and 114 from unraveling a pawl generally indicated at 127 is provided. The pawl 127 is comprised of a detent element 128 mounted on the bottom end plate 29 as best shown in Figures 1 and 4. The detent element 128 is pivotally mounted for horizontal movement on a post 129 disposed adjacent the ratchet wheel 121. The post 129 is mounted rigidly in a small bore 130 in the bottom end plate 29 of the drum 28 as best shown in Figure 4. One end of the detent element 128 is connected to a one end of a spring 131 under tension. The other end of the spring 131 is anchored to the drum 28 thus urging the detent element 128 to move in a clockwise direction as illustrated in Figure 1. The other end of the detent element 128 is hook shaped adapted to engage the teeth 132 of the ratchet wheel 121. The teeth 132 and the hook shaped end of the detent element 128 are arranged to permit counter-clockwise rotation of the ratchet wheel 121 and prevent clockwise movement of the wheel in a commonly known manner.

*Operation*

With the cover plate 19 of the chamber 16 removed and the upper end plate 30 of the drum 28 removed the operator inserts the first reel 56, having a supply of unexposed photographically active film 33 thereon, over the first spindle 51. The first reel 56 of film 33 is, as commonly furnished commercially by film manufacturers, provided with an appreciable length of leader material, such as cloth or strong paper, which precedes the initial portion of the active film thereon. Similarly it is standard practice of film manufactureres to provide a trailer of cloth or strong paper commencing at the end of the active film and extending for an appreciable length to the core of the reel. After the reel 56 of unexposed active film is inserted over the spindle 51, the leader is threaded to engage the metering roller 81, idler roller 73, through the opening 34, around the film track 32 from points A to B, counter-clockwise, thence through the opening 34, over the idler roller 72 and connected to the core of the second reel 67 inserted over the second spindle 61. If the leader material is suitably marked for length it can be wound on the second reel 67 until the marker corresponding to one exposure length of leader remaining on the first reel 56 appears at point A.

Next the operator manually rotates the metering roller 81 in a clockwise direction until the vertical hole or first stop means 89 of the fourth gear 88 is in registry with the finger 103 of the dual latch mechanism 90. The latch mechanism then automatically engages to arrest further movement of the metering roller 81 and the finger 102 engages one of the holes or second stop means 60 of the disk 54 to arrest further movement of the disk and associated first reel 56.

The leader portion preceding the active film is now under tension because the second reel 67 is movable only in a counter-clockwise direction due to the action of the pawl 127 on the ratchet wheel 121. Thus at this point the first reel 56 and the second reel 67 cannot be moved in either direction.

The operator then takes the third reel 110 having a corresponding supply of photographically inactive film 114 thereon and connects the leader portion thereof to the core of the fourth reel 123. He then places the third reel 110 over the third spindle 104 and the fourth reel 123 over the fourth spindle 115. Since the second reel 67 is restrained from movement in either direction the fourth reel 123 is also restrained from movement in either direction because the second gear 65 and the third gear 120 are meshed with the first gear 43. The operator then rotates the third reel 110 in a counter-clockwise direction to remove any slack in the film or leader 114.

The top end plate 30 is then replaced and then the four nuts 53, 64, 108 and 119 are tightened on the threaded upper end portions of the first, second, third and fourth spindles 51, 61, 104 and 115 respectively. The top end plate 29 is now securely connected to the drum 28.

Next the cover plate 19 of the chamber 16 is replaced and connected to the walls 17 by the various screws 21 tightly to prevent entrance of stray light rays.

The socket 134 of the crank 133 (Figure 10) is then inserted over the outer end 49 of the sleeve shaft 38. With a downward manual force applied to the knob 135 the sleeve shaft 38 moves downwardly overcoming the upward urge of the spring 47. The downward movement of the sleeve shaft 38 causes the flange 45 of the sleeve shaft 38 to engage the operating arm 97 of the dual latch mechanism 90. The corresponding downward movement of the arm 97 causes the leg 99 of the latch mechanism 90 to rise through the rocking on pins 95 on the U-shaped member 91. The rise of the leg 99 lifts the fingers 103 and 102 out of engagement with the hole or first stop means 89 on the gear 88 and one of the holes or second stop means 60 on the disk 54. In this position a clockwise movement of the handle 136 of the crank 133 rotates the sleeve shaft 38 and its associated first gear 43 in a clockwise direction. The first gear 43 being in meshed relation with the second gear 65 causes the gear 65 and its associated second reel 67 to rotate in a counterclockwise direction. The movement of the second reel 67 in a counter-clockwise direction pulls the film or leader 33 thus rotating the first reel 56 and the metering roller 81. After an initial movement of the crank 133 the metering roller 81 will have rotated sufficiently to move the first stop means or hole 89 in the gear 88 out of registry with the finger 103. Thereafter the downward force exerted on the knob 135 of the crank 133 may be discontinued as the dual latch mechanism 90 will remain disengaged until the first stop means or hole 89 is again in registry with the finger 103. Meanwhile the finger 103 rides on the smooth upper surface of the gear 88.

The crank 133 is rotated further which results in the film 33 or its leader being dispensed from the first reel 56 to the second reel 67 via the film track 32. As soon as the rotation of the crank 133 and associated sleeve shaft 38 has been sufficient to move one exposure length of film 33 or its leader from the first reel 56, the corresponding movement of the metering roller 81 will have caused one complete revolution of the gear 88 thereby positioning the hole or first stop means 89 in registry with the finger 103 of the dual stop mechanism. The finger 103 at the downward urging caused by the spring 47 acting on the sleeve shaft 38 and the latch mechanism 90 automatically engages the hole 89 and simultaneously the finger 102 engages the nearest hole or second stop means 60 of the disk 54, thus locking both the metering roller 81 and first reel 56 from further rotation.

It will be evident that the first cycle of film movement above described, the initial edge of the photographically active film 33 will have reached point A, the beginning of the film track 32. Repeating the above described operation once again places the initial edge of the active film 33 at point B on the drum. The first exposure length of active film 33 is now disposed on the film track 32 in position for exposure to rays entering the camera's lenses through aperture 23. The crank 133 is then removed.

Meanwhile and simultaneously with the above described film moving operation, each time the sleeve shaft 38 is rotated respective to the drum 28, the first gear 43 also causes rotation of the third gear 120 and its associated fourth reel 123. Accordingly an amount of film 114 is dispensed by tension on the film 114 from the third reel 110 to the fourth reel 123 corresponding to the amount of film 33 transferred from the first reel 56 to the second reel 67. Thus the weight of the film 33 shifted in the drum 28 is counterbalanced in diametric opposed relation by an equal amount of film 114 shifted simultaneously. Thus the weight distribution of the film 33 in the drum is always counterbalanced simultaneously by a corresponding shift of the counterbalancing film 114 from the third reel 110 to the fourth reel 123 resulting in maintaining the rotatable drum 28 in a dynamically balanced condition at all times. However, initially it may be desirable to place fixed weights within the drum 28 to permanently compensate for deviations in weight distribution due to other causes such as weight variations occurring in the manufacture of the various components. Such fixed balancing weights may be conveniently connected to the inner periphery of the drum 28 one of which is illustrated at 137 of Figure 1.

Since the length of photographically active film 33 initially contained on the first reel 56 is known it is convenient to have some means of counting the number of individual exposures made so that no inadvertent use of the camera is made after the supply of film 33 has been exhausted and transferred to the second reel 67. For this purpose a small electric micro-switch 138 is mounted on the bottom end plate 29 of the drum 28 adjacent the U-shaped member 91 of the latch mechanism 90 as best shown in Figures 1, 6 and 7. The arcuate movement of the leg 99 about the pins 95 operates the contact lever 139 of the switch 138. The pair of electrical conductors or wires 140 leading from the switch 138 are carried through a centrally located bore in the bottom end plate 29 of the drum 28 which bore extends into a portion of the drive shaft 26 for connection to a corresponding pair of insulated slip rings 141 disposed annularly about the shaft 26 as best shown in Figures 2 and 3. A corresponding pair of brushes 142 are connected to an electrically operable counter (not shown) in series with a source of electric energy. Thus each time the dual latch mechanism 90 is operated the micro-switch 138 closes the electric circuit which in turn energizes the counter for recording the number exposure lengths of the active film 33 dispensed from the first reel 56 or, in short, it serves to count the number of exposures made for a given loading of film 33 in the magazine 35. By this means the operator may know at all times the amount of film 33 of the magazine 35 which has been used or exposed and of course the corresponding amount of unused film.

After an exposure length of the film 33 is moved on to the film track 32, the crank 133 is removed and the drum 28 is rotated at a predetermined speed of rotation in a clockwise direction as indicated by the arrow in Figure 1. In connection with the source of power used for rotating the drum 28 any one of various known means are provided for admitting photographically active rays through the aperture 23 and associated lenses synchronized to begin precisely at the time when point A of the drum 28 reaches point C of Figure 1 in line with the aperture 23 and associated lenses, and the active rays are continued to be admitted until the drum 28 rotates sufficiently to bring point B in line with point C. The active rays entering through the aperture 23 are then terminated automatically thus completing the exposure of the active film 33 on the track 32. Further details of the means for electronically timing the exposure period in relation to the rotating drum 28 will not be described as it forms no part of the invention.

After the last exposure of the film 33 has been made, the operator merely applies the crank 133 to the outer end 49 of the sleeve shaft 38 and after releasing the latch mechanism 90 as above described, rotates the crank 133 sufficiently to wind the trailer of the film 33 to the reel 67. The crank 133 is then removed, the cover plate 19 and top end plate 30 are then removed in reverse order to that described above for loading and assembling. The exposed film 33 on the second reel 67 is then removed from the drum 28, the film 33 on the reel then being ready for transmittal to a photographic dark room for development thereof in a commonly known manner.

Having thus described an embodiment of the invention, it can now be seen that the objects of the invention have been fully achieved and it must be understood that changes and modifications may be made which do not depart from the spirit of the invention as disclosed nor from the scope thereof as defined in the appended claims.

What is claimed is:

1. A photographic camera including a rotatable magazine of photographically active film comprising an apertured chamber having a removable cover plate, a system of lenses mounted in the apertured portion of said chamber, means for admitting light rays through said lenses into said chamber for a predetermined period of time, a first bearing member mounted on and extending through said cover plate, a second bearing member mounted adjacent to and extending through the bottom of said chamber, said second bearing member being axially aligned with said first bearing member, a vertically disposed drive shaft mounted in said chamber and constrained for rotation in said second bearing member, one end of said drive shaft extending through said second bearing member externally of said chamber, an external source of power drivingly connected to said drive shaft for rotation thereof at a predetermined speed of rotation, a rotatable drum including a magazine of photographically active film mounted in said chamber and constrained for rotation with said drive shaft, the other end portion of said drive shaft extending into said drum, a sleeve shaft slidably mounted in said drum concentrically on said upper portion of said drive shaft, one end of said sleeve shaft extending through the upper end of said drum and said first bearing member externally of said chamber, means for limiting upward movement of said sleeve shaft relative to said drive shaft, a pair of large diameter annular shaped flanges disposed adjacent the other end portion of said sleeve shaft forming a circumferential groove on said sleeve shaft, a captive helical spring adapted to engage one of said flanges for urging said sleeve shaft upwardly, a first gear mounted in said drum adjacent the bottom thereof and constrained for axial rotation with said sleeve shaft, a first spindle mounted vertically in said drum, a first reel mounted on and constrained for axial rotation on said first spindle, said first reel being adapted to accommodate unexposed photographically active film, a disk mounted on said first spindle adjacent the bottom of said drum and constrained for rotation with said first reel, a second spindle mounted vertically in said drum, a second reel mounted on and constrained for axial rotation on said second spindle, said second reel being adapted to accommodate photographically active film dispensed from said first reel, a second gear mounted on said second spindle adjacent the bottom of said drum and constrained for rotation with said second reel, said first and second gears being in meshed relation with each other, a third spindle mounted vertically in said drum, said third spindle being positioned in diametric spaced relation with respect to said first spindle, a third reel mounted on and constrained for axial rotation on said third spindle, a friction element mounted on the upper portion of said third spindle adapted to engage frictionally said third reel for yieldable rotation of said third reel, said third reel being adapted to accommodate photographically inactive film having substantially equivalent weight per unit length characteristics as said photographically active film, a fourth spindle mounted vertically in said drum, said fourth spindle being positioned in diametric spaced relation with respect to said second spindle, a fourth reel mounted on and constrained for axial rotation on said fourth spindle, said fourth reel being adapted to accommodate photographically inactive film dispensed from said third reel, a ratchet wheel mounted on said fourth spindle adjacent the bottom of and constrained for rotation with said fourth reel, a pawl mounted in said drum adjacent to said ratchet wheel and adapted to engage said ratchet wheel for preventing rotation of said fourth reel in one direction and yieldable for rotation of said fourth reel in the other direction, a third gear mounted on said fourth spindle adjacent the bottom thereof and constrained for rotation with said ratchet wheel and said fourth reel, said third gear and said first gear being in meshed relation with each other, a vertically extending metering roller mounted in and journalled for rotation in said drum, said metering roller being positioned adjacent to said first and second reels and adapted to engage frictionally said unexposed photographically active film dispensed from said first reel, a pinion gear mounted on said metering roller adjacent the bottom thereof and constrained for rotation with said metering roller, a fourth gear rotatably mounted in said drum adjacent said metering roller and said first spindle, said fourth gear and said pinion gear being in meshed relation with each other, said fourth gear having a first stop element radially positioned on the diametrical surface thereof, a plurality of second stop elements radially positioned on said disk, a releasably engageable dual latch mechanism mounted in the lower portion of said drum adjacent said first gear and said fourth gear, said latch mechanism adapted to engage releasably said first stop element and one of said second stop elements simultaneously, said latch mechanism having an operating arm extended into engagement with said circumferential groove of said sleeve shaft and adapted for releasing said latch mechanism upon downward movement of said sleeve shaft, said drum having a circumferentially disposed film track on the outer periphery thereof, said film track being substantially the same width as said photographically active film, said film track being adapted to support a portion of said unexposed photographically active film in position for exposure to light rays entering said chamber through said lenses, a vertically extending slot disposed in said periphery of said drum adjacent to said metering roller and said second reel for accommodating photographically active film therethrough a pair of idler rollers positioned vertically in spaced relation adjacent to said slot, one of said idler rollers being adapted to guide said unexposed photographically active film dispensed from said first reel to said film track and the other idler roller adapted to guide said exposed photographically active film from said film track to said second reel, said metering roller and associated pinion gear and said fourth gear being interrelated to permit said first reel to dispense sufficient photographically active unexposed film to cover said film track whereby said latch mechanism automatically engages said first stop element and one of said second stop elements, and external manually operable means for engaging said sleeve shaft for releasing said latch mechanism and driving said first gear with said second and third gears to move said unexposed photographically active film to said film track and winding said exposed photographically active film from said film track to said second reel simultaneously with the dispensing of said photographically inactive film from said third reel to said fourth reel.

2. In combination with a photographic camera, a rotatable magazine of photographically active film comprising a hollow cylindrically shaped axially rotatable drum having a bottom end plate and a removable top plate, a drive shaft journalled for rotation in said camera, a source of power adapted to rotate said drive shaft at a predetermined speed of rotation, said drum being mounted on said drive shaft and constrained for rotation therewith, the upper portion of said drive shaft extending into said drum, a sleeve shaft slidably mounted in said drum concentrically on said upper portion of said drive shaft, means for limiting upward movement of said sleeve shaft relative to said drive shaft, a pair of annular shaped flanges disposed in spaced relation adjacent the lower end portion of said sleeve shaft forming a circumferential groove on said sleeve shaft, a captive helical spring adapted to engage one of said flanges for urging said sleeve shaft upwardly, a first gear mounted in said drum adjacent the bottom thereof and constrained for axial rotation with said sleeve shaft, a first spindle mounted vertically in said drum, a first reel mounted on and constrained for axial rotation on said first spindle, said first reel being adapted to accommodate unexposed photographically active film, a disk mounted on said first spindle adjacent the bottom of said drum and constrained for rotation with said first reel, a second spindle mounted vertically in said drum, a second reel mounted on and constrained for axial rotation on said second spindle, said second reel being adapted to accommodate photographically active film dispensed from said first reel, a second gear mounted on said second spindle adjacent the bottom of said drum and constrained for rotation with said second reel, said first and second gears being in meshed relation with each other, a third spindle mounted vertically in said drum, said third spindle being positioned in diametric spaced relation with respect to said first spindle, a third reel mounted on and constrained for axial rotation on said third spindle, a friction element mounted in the upper portion of said third spindle contiguous to said top plate and adapted to engage frictionally said third reel for yieldable rotation of said third reel, said third reel being adapted to accommodate photographically inactive counter-balancing film having substantially equivalent weight per unit length characteristics as said photographically active film, a fourth spindle mounted vertically in said drum, said fourth spindle being positioned in diametric spaced relation with respect to said second spindle, a fourth reel mounted on and constrained for axial rotation on said fourth spindle, said fourth reel being adapted to accommodate photographically inactive counter-balancing film dispensed from said third reel, means associated with said fourth reel for preventing rotation thereof in one direction and yieldable for rotation in the other direction, a third gear mounted on said fourth spindle adjacent the bottom thereof and constrained for rotation with said fourth reel, said third gear and said first gear being in meshed relation with each other, a vertically extending metering roller mounted in and journalled for rotation in said drum, said metering roller being positioned adjacent to said first and second reels and adapted to engage frictionally said unexposed photographically active film dispensed from said first reel, a pinion gear mounted on said metering roller adjacent the bottom thereof and constrained for rotation therewith, a fourth gear rotatably mounted in said drum adjacent said metering roller and said first spindle, said fourth gear and said pinion gear being in meshed relation with each other, said fourth gear having a first stop element radially positioned on the diametrical surface thereof, a plurality of second stop elements radially positioned on said disk, a releasably engageable dual latch mechanism mounted in the lower portion of said drum adjacent said first gear and said fourth gear, said latch mechanism adapted to engage releasably said first stop element and one of said second stop elements simultaneously, said latch mechanism having an operating arm extended into engagement with said circumferential groove of said sleeve shaft adapted for releasing said latch mechanism upon downward movement of said sleeve shaft, said drum having a circumferentially disposed film track on the outer periphery thereof, said film track being substantially the same width as said photographically active film, said film track being adapted to support a portion of said unexposed photographically active film in position for exposure to light rays entering said camera, a vertically extending slot disposed in said periphery of said drum adjacent to said metering roller and said second reel for accommodating photographically active film therethrough, a pair of idler rollers positioned vertically in spaced relation adjacent to said slot, one of said idler rollers being adapted to guide said unexposed photographically active film dispensed from said first reel to said film track and the other idler roller adapted to guide said exposed photographically active film from said film track to said second reel, said metering roller and associated pinion gear and said fourth gear being interrelated to permit said first reel to dispense sufficient unexposed photographically active film to cover said film track whereby said latch mechanism automatically engages said first stop element and one of said second stop elements, and external manually operable means for engaging said sleeve shaft for releasing said latch mechanism and driving said first gear with said second gear and third gear to move said unexposed photographically active film from said first reel to said film track and winding said exposed photographically active film from said film track to said second reel simultaneously with the dispensing of said photographically inactive counter-balancing film from said third reel to said fourth reel.

3. As a part of a photographic camera, a rotatable magazine of photographically active film comprising a cylindrically shaped axially rotatable drum having a bottom end plate and a removable top end plate, a drive shaft journalled for rotation in said camera, a source of power adapted to rotate said drive shaft at a predetermined speed of rotation, said drum being mounted on said drive shaft and constrained for rotation therewith, the upper portion of said drive shaft extending into said drum, a sleeve shaft slidably mounted concentrically on the upper portion of said drive shaft, means for limiting upward movement of said sleeve shaft relative to said drive shaft, resilient means for urging said sleeve shaft in one direction, a first gear mounted in said drum adjacent the bottom thereof and constrained for axial rotation with said sleeve shaft, a first reel rotatably mounted vertically in said drum, said first reel adapted to accommodate unexposed photographically active film, a disk mounted on said first reel adjacent the bottom of said drum and constrained for rotation with said first reel, a second reel rotatably mounted vertically in said drum, said second reel being adapted to accommodate exposed photographically active film dispensed from said first reel, a second gear mounted coaxially with said second reel adjacent the bottom of said drum and constrained for rotation with said second reel, said first and second gears being in meshed relation with each other, a third reel rotatably mounted vertically in said drum, said third reel being positioned in diametric spaced relation with respect to said first reel, a friction element mounted on the upper portion of said third reel contiguous to said top end plate and adapted to engage frictionally said third reel for yieldable rotation of said third reel, said third reel being adapted to accommodate photographically inactive counter-balancing film having substantially equivalent weight per unit length characteristics as said photographically active film, a fourth reel rotatably mounted vertically in said drum, said fourth reel being positioned in diametric spaced relation with respect to said second reel, said fourth reel being adapted to accommodate photographically inactive counter-balancing film dispensed from said third reel, means associated with said fourth reel for preventing rotation thereof in one direction and yieldable for rotation in the other direction, a third gear mounted coaxially with said fourth reel adjacent the bottom of said drum and constrained for rotation with said fourth reel, said third gear and said first gear being in meshed relation with each other, a vertically extending metering roller rotatably mounted in said drum, said metering roller being positioned adjacent to said first and second reels and adapted to engage frictionally said unexposed photographically active film dispensed from said first reel, a pinion gear mounted on said metering roller adjacent the bottom thereof and constrained for rotation therewith, a fourth gear rotatably mounted in said drum adjacent said metering roller and said first reel, said fourth gear and said pinion gear being in meshed relation with each other, said fourth gear having a first stop element radially positioned on the diametrical surface thereof, a plurality of second stop elements radially positioned on said disk, a releasably engageable dual latch mechanism mounted in the lower portion of said drum adjacent said first gear and said fourth gear, said latch mechanism adapted to engage releasably said first stop element and one of said second stop elements simultaneously, said latch mechanism having an operating arm extended to and in engaging relationship with said sleeve shaft for vertical movement thereof, said drum having a circumferentially disposed film track on the outer periphery thereof, said film track being substantially the same width as said photographically active film, said film track being adapted to support a portion of said unexposed photographically active film in position for exposure to light rays entering said camera, a vertically extending slot disposed in said periphery of said drum adjacent to said metering roller and said second reel for accommodating photographically active film therethrough, a pair of idler rollers positioned vertically in spaced relation adjacent to said slot, one of said idler rollers being adapted to guide said unexposed photographically active film dispensed from said first reel to said film track and the other idler roller adapted to guide said photographically active film from said film track to said second reel, said metering roller and associated pinion gear and said fourth gear being interrelated to permit said first reel to dispense sufficient unexposed photographically active film to cover said film track whereby said latch mechanism automatically engages said first stop element and one of said second stop elements, and external manually operable means for engaging said sleeve shaft for releasing said latch mechanism and driving said first gear with said second gear and third gears to move said unexposed photographically active film from said first reel to said film track and winding said photographically active film from said film track to said second reel simultaneously with the dispensing of said photographically inactive counter-balancing film from said third reel to said fourth reel.

4. As part of a photographic camera, a rotatable magazine of photographically active film comprising a cylindrically shaped axially rotatable drum having a bottom end plate and a removable top end plate, a drive shaft journalled for rotation in said camera, a source of power adapted to rotate said shaft at a predetermined speed of rotation, said drum being mounted on said drive shaft and constrained for rotation therewith, the upper portion of said drive shaft extending into said drum, a sleeve shaft slidably mounted concentrically on the upper portion of said drive shaft, means for limiting upward movement of said sleeve shaft relative to said drive shaft, yieldable means for urging said sleeve shaft in one direction, a first gear mounted in said drum adjacent the bottom thereof and constrained for axial rotation with said sleeve shaft, a first reel rotatably mounted in said drum, said first reel adapted to accommodate unexposed photographically active film, a second reel rotatably mounted in said drum, said second reel being adapted to accommodate photographically active film dispensed from said first reel, a second gear mounted coaxially with said second reel adjacent the bottom of said drum and constrained for rotation with said second reel, said first and second gears being in meshed relation with each other, a third reel rotatably mounted in said drum, said third reel being positioned in diametric spaced relation with respect to said first reel, a friction element mounted in said drum adapted to engage frictionally said third reel for yieldable rotation thereof, said third reel being adapted to accommodate photographically inactive counter-balancing film having substantially equivalent weight per unit length characteristics as said photographically active film, a fourth reel rotatably mounted in said drum, said fourth reel being positioned in diametric spaced relation with respect to said second reel, said fourth reel being adapted to accommodate photographically inactive counter-balancing film dispensed from said third reel, means associated with said fourth reel for yieldably resisting axial rotation thereof, a third gear mounted coaxially with said fourth reel and constrained for rotation with said fourth reel, said third gear and said first gear being in meshed relation with each other, a metering roller rotatably mounted in said drum, said metering roller being positioned adjacent to said first and second reels and adapted to engage said photographically active film between said first and second reels, a pinion gear mounted on said metering roller and constrained for rotation therewith, a fourth gear rotatably mounted adjacent said metering roller, said fourth gear and said pinion gear being in meshed relation with each other, said fourth gear having a first stop element positioned thereon, a plurality of second stop elements associated with said first reel, a releasably engageable latch mechanism mounted in said drum, said latch mechanism being adapted to engage releasably said first stop element and one of said second stop elements simultaneously, said latch mechanism being in operable cooperative relation with vertical movement of said sleeve shaft, said drum having a film track disposed on the outer periphery thereof, said film track being substantially the same width as said photographically active film, said film track being adapted to support a portion of said photographically active film in position for exposure to light rays entering said camera, a slot disposed in the periphery of said drum for accommodating photographically active film therethrough, a pair of idler rollers positioned vertically in spaced relation adjacent to said slot, one of said rollers being adapted to guide said unexposed photographically active film dispensed from said first reel to said film track and the other idler roller adapted to guide said photographically active film from said film track to said second reel, said metering roller and associated pinion gear and said fourth gear being interrelated to permit said first reel to dispense sufficient unexposed photographically active film to cover said film track whereby said latch mechanism automatically engages said first stop element and one of said second stop elements, and external manually operable means for engaging said sleeve shaft for releasing said latch mechanism and driving said first gear with said second and third gears to move said photographically active film from said first reel to said film track and winding said photographically active film from said film track to said second reel simultaneously with the dispensing of said photographically inactive counter-balancing film from said third reel for accommodation thereof by said fourth reel.

5. As part of a photographic camera, a rotatable magazine of photographically active film comprising a cylindrically shaped axially rotatable drum having a bottom end plate and a removable top end plate, a drive shaft journalled for rotation in said camera, a source of power adapted to rotate said drive shaft at a predetermined speed of rotation, said drum being mounted on said drive shaft and constrained for rotation therewith, the upper portion of said drive shaft extending into said drum, a sleeve shaft slidably mounted concentrically on the upper portion of said drive shaft, means for limiting upward movement of said sleeve shaft relative to said drive shaft, yieldable means for urging said sleeve shaft in one direction, a first gear mounted in said drum adjacent the bottom thereof and constrained for axial rotation with said sleeve shaft, a first reel rotatably mounted in said drum, said first reel adapted to accommodate unexposed photographically active film, a second reel rotatably mounted in said drum, said second reel being adapted to accommodate photographically active film dispensed from said first reel, a second gear mounted coaxially with said second reel adjacent the bottom of said drum and constrained for rotation with said second reel, said first and second gears being in meshed relation with each other, a third reel mounted in said drum, said third reel being positioned in diametric spaced relation with respect to said first reel, a friction element mounted in said drum adapted to engage frictionally said third reel for yieldable rotation thereof, said third reel being adapted to accommodate photographically inactive counter-balancing film having substantially equivalent weight per unit length characteristics as said photographically active film, a friction element mounted in said drum adapted to engage frictionally said third reel for yieldable rotation thereof, a fourth reel mounted in said drum, said fourth reel being positioned in diametric spaced relation with respect to said second reel, said fourth reel being adapted to accommodate photographically inactive counter-balancing film dispensed from said third reel, means associated with said fourth reel for yieldably resisting axial rotation thereof, a third gear mounted coaxially with said fourth reel and constrained for rotation with said fourth reel, a metering roller rotatably mounted in said drum, said metering roller being positioned adjacent to said first and second reels and adapted to engage said photographically active film between said first and second reels, a pinion gear mounted on said metering roller and constrained for rotation therewith, a fourth gear rotatably mounted adjacent said metering roller, said fourth gear and said pinion gear being in meshed relation with each other, said fourth gear having a first stop element positioned thereon, a plurality of second stop elements associated with said first reel, a releasably engageable latch mechanism mounted in said drum, said latch mechanism being adapted to engage releasably said first stop element and one of said second stop elements simultaneously, said latch mechanism being in operable cooperative relation with vertical movement of said sleeve shaft, said drum having a film track disposed on the outer periphery thereof, said film track being substantially the same width as said photographically active film, said film track being adapted to support a portion of said photographically active film in position for exposure to light rays entering said camera, an opening disposed in the periphery of said drum for accommodating photographically active film therethrough, means for guiding said photographically active film dispensed from said first reel to said film track, means for guiding said photographically active film from said film track to said second reel, said metering roller and associated pinion gear and said fourth gear being interrelated to permit said first reel to dispense sufficient unexposed photographically active film to cover said film track whereby said latch mechanism automatically engages said first stop element and one of said second stop elements, and external manually operable means for engaging said sleeve shaft for releasing said latch mechanism and driving said first gear with said second and third gears to move said photographically active film from said first reel to said film track and winding said photographically active film from said film track to said second reel simultaneously with the dispensing of said photographically inactive counter-balancing film from said third reel to said fourth reel.

6. As part of a photographic camera, a rotatable magazine of photographically active film comprising a cylindrically shaped axially rotatable drum having a bottom end plate and a removable top end plate, a drive shaft journalled for rotation in said camera, a source of power adapted to rotate said drive shaft at a predetermined speed of rotation, said drum being mounted on said drive shaft and constrained for rotation therewith, the upper portion of said drive shaft extending into said drum, a sleeve shaft slidably mounted concentrically on the upper portion of said drive shaft, means for limiting upward movement of said sleeve shaft relative to said drive shaft, yieldable means for urging said sleeve shaft in one direction, a first gear mounted in said drum adjacent the bottom thereof and constrained for axial rotation with said sleeve shaft, a first reel rotatably mounted in said drum, said first reel adapted to accommodate unexposed photographically active film, a second reel rotatably mounted in said drum, said second reel being adapted to accommodate photographically active film dispensed from said first reel, a second gear mounted coaxially with said second reel adjacent the bottom of said drum and constrained for rotation with said second reel, said first and second gears being in meshed relation with each other, a third reel mounted in said drum, said third reel being positioned in diametric spaced relation with respect to said first reel, a friction element mounted in said drum adapted to engage frictionally said third reel for yieldable rotation thereof, said third reel being adapted to accommodate photographically inactive counter-balancing film having substantially equivalent weight per unit length characteristics as said photographically active film, a fourth reel mounted in said drum, said fourth reel being positioned in diametric spaced relation with respect to said second reel, said fourth reel being adapted to accommodate photographically inactive counter-balancing film dispensed from said third reel, means associated with said fourth reel for yieldably resisting axial rotation thereof, a third gear mounted coaxially with said fourth reel, means for metering photographically active film dispensed from said first reel, a releasably engageable latch mechanism mounted adjacent said first reel, said latch mechanism being operably associated with said sleeve shaft and adapted to lock said first reel from rotation automatically when said first reel has dispensed a predetermined quantity of photographically active film therefrom, said drum having a film track disposed on the outer periphery thereof, said film track being adapted to support a portion of said photographically active film in position for exposure to light rays entering said camera, an opening disposed in the periphery of said drum for accommodating photographically active film therethrough, means for guiding said photographically active film disposed from said first reel to said film track, means for guiding said photographically active film from said film track to said second reel, and externally operable means for engaging said sleeve shaft for releasing said latch mechanism and driving said first gear with said second and third gears to move said photographically active film from said first reel to said film track and winding said photographically active film from said film track to said second reel simultaneously with the dispensing of said photographically inactive counter-balancing film from said third reel to said fourth reel.

References Cited in the file of this patent

UNITED STATES PATENTS

| | | |
|---|---|---|
| 2,466,411 | Geradin | Apr. 5, 1949 |
| 2,604,376 | Tuttle et al. | July 22, 1952 |

FOREIGN PATENTS

| | | |
|---|---|---|
| 603,993 | Great Britain | June 25, 1948 |